(12) United States Patent
Schanz et al.

(10) Patent No.: US 6,241,040 B1
(45) Date of Patent: Jun. 5, 2001

(54) MOTORCYCLE DRIVE ASSEMBLY WITH IMPROVED TRANSMISSION-TO-ENGINE MOUNTING

(75) Inventors: John W. Schanz, Mequon; Gary Lockwitz, Cedarburg; R. Bruce Dennert, Waukesha; Jalal M. Albulushi, Jackson; Kenneth W. Kuntz, Tomahawk; Thomas E. Zimmerman, Milwaukee; Robert L. Leppanen, Wauwatosa, all of WI (US)

(73) Assignee: Harley-Davidson Motor Company, Milwaukee, WI (US)

( * ) Notice: Subject to any disclaimer, the term of this patent is extended or adjusted under 35 U.S.C. 154(b) by 0 days.

(21) Appl. No.: 09/525,387

(22) Filed: Mar. 15, 2000

Related U.S. Application Data

(63) Continuation of application No. 09/122,007, filed on Jul. 24, 1998, now Pat. No. 6,085,855.
(60) Provisional application No. 60/091,228, filed on Jun. 30, 1998.

(51) Int. Cl.[7] .................................................. B60K 17/00
(52) U.S. Cl. .................... 180/219; 180/374; 123/196 AB
(58) Field of Search ........................... 180/219, 292, 180/230, 231, 374; 123/195 R; 74/606 R

(56) References Cited

U.S. PATENT DOCUMENTS

| | | |
|---|---|---|
| 4,550,698 | 11/1985 | Konneker . |
| 4,606,310 | 8/1986 | Makino . |
| 4,688,523 | 8/1987 | Takahashi et al. . |
| 4,690,236 | 9/1987 | Shinozaki et al. . |
| 4,736,809 * | 4/1988 | Kumazawa ........................... 180/292 |
| 5,025,673 | 6/1991 | Yamada . |
| 5,070,830 | 12/1991 | Malven et al. . |
| 5,458,101 | 10/1995 | Crooks . |
| 5,495,833 | 3/1996 | Ishizaka et al. . |
| 5,937,817 * | 8/1999 | Schanz et al. . |
| 6,085,855 * | 7/2000 | Schanz et al. ....................... 180/219 |

FOREIGN PATENT DOCUMENTS

| | | |
|---|---|---|
| 1213 164 | 3/1966 | (DE) . |
| 1225 061 | 9/1966 | (DE) . |

OTHER PUBLICATIONS

1994 Custom Chrome Catalog; p. 170.
1993 and 1994 –1340 Models Parts Catalog; pp. 44 and 48.
Vintage Motorcycle Road Tests, 'Online! XP–002145070 <URL: www.squirrel.com.au/netbikes/roadtests/meteor.htm> Received on Aug. 16, 2000.

* cited by examiner

Primary Examiner—J. J. Swann
Assistant Examiner—Christopher Bottorff
(74) Attorney, Agent, or Firm—Michael Best & Friedrich LLP

(57) ABSTRACT

A drive assembly for a motorcycle including an engine having an output shaft and a transmission having an input shaft parallel to the output shaft and coupled to the output shaft. The engine includes a crankcase having a first interface portion with a first non-horizontal mounting surface. The transmission includes a transmission case having a second interface portion with a second non-horizontal mounting surface arranged to engage the first non-horizontal mounting surface. The second interface portion of the transmission case includes at least one fluid passage for the flow of fluid to or from the engine.

10 Claims, 6 Drawing Sheets

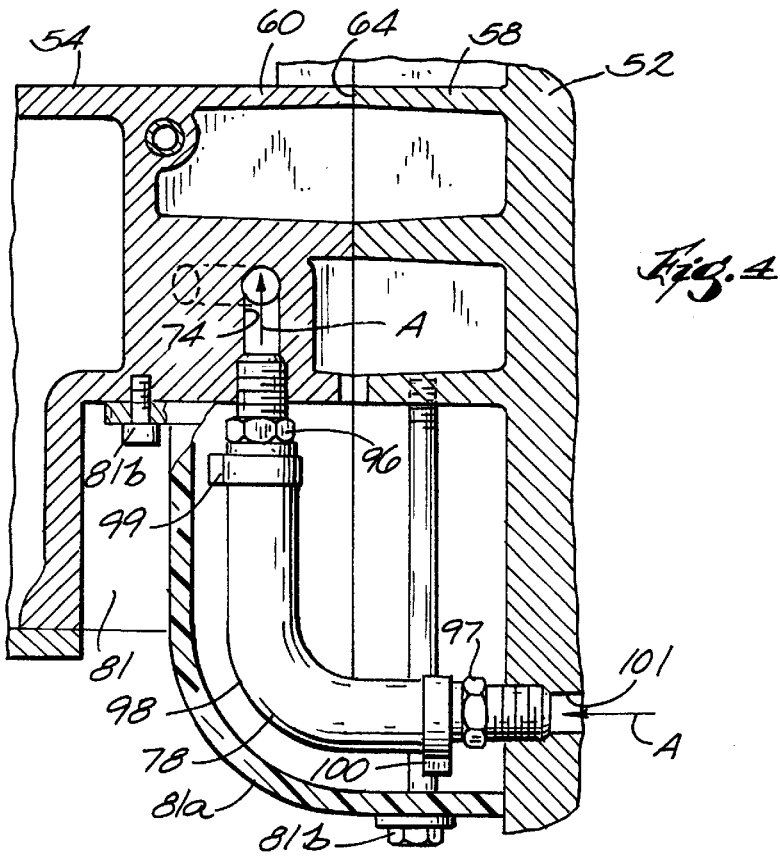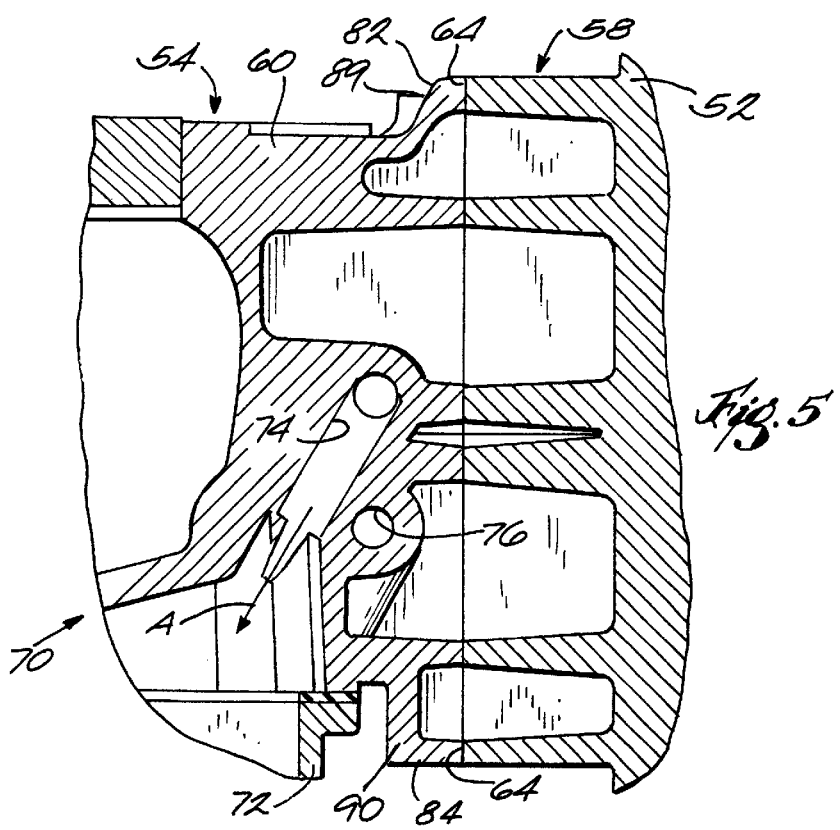

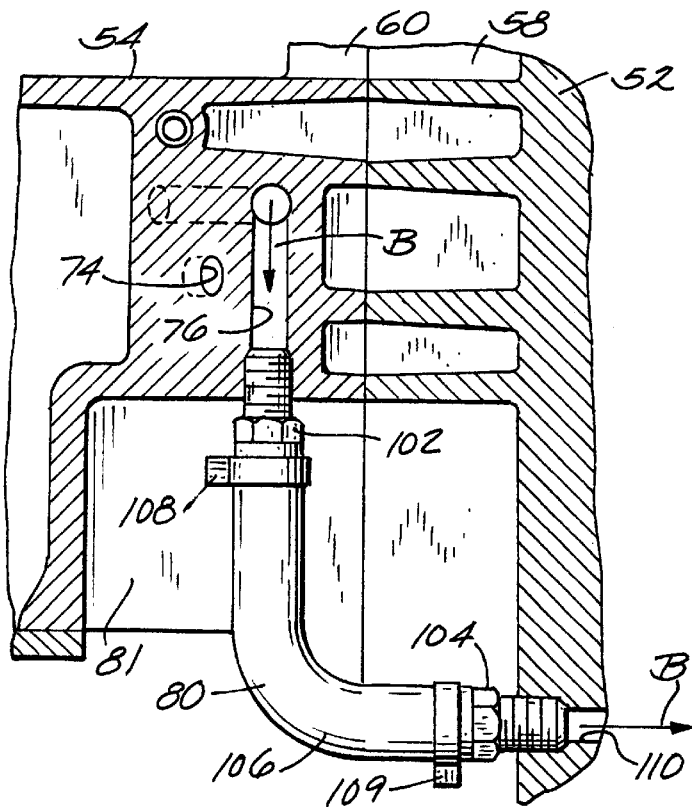
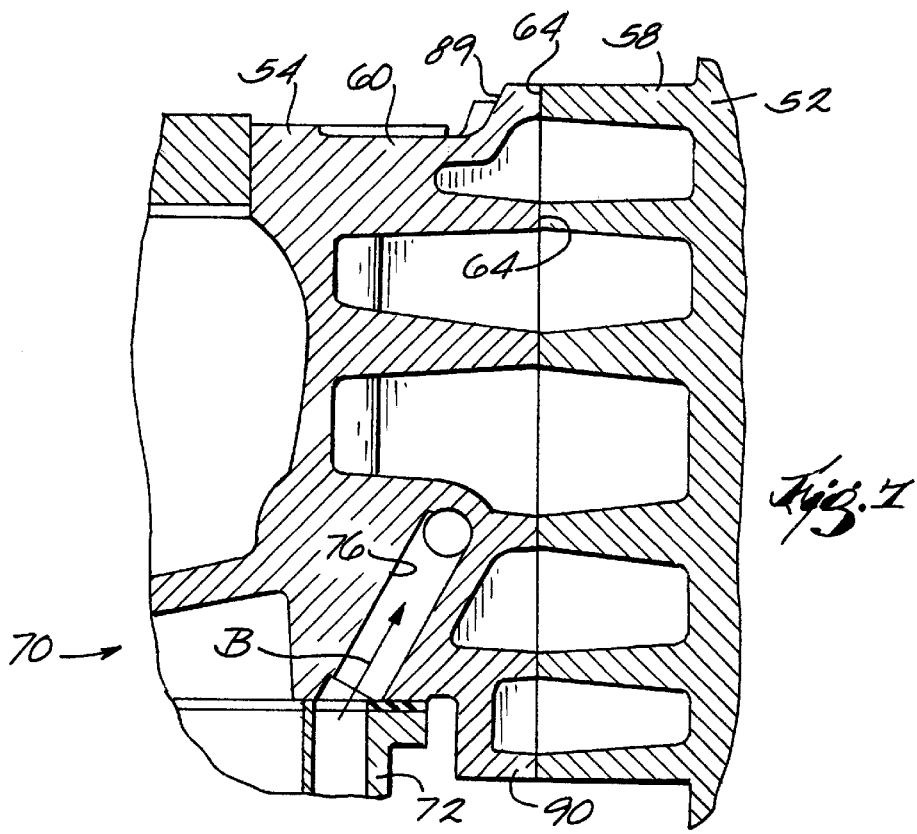

MOTORCYCLE DRIVE ASSEMBLY WITH IMPROVED TRANSMISSION-TO-ENGINE MOUNTING

This application is a continuation of application Ser. No. 09/122,007, filed Jul. 24, 1998 now U.S. Pat. No. 6,085,855, which claims the benefit of Provisional Application No. 60/091,228, filed Jun. 30, 1998.

FIELD OF THE INVENTION

The present invention relates to motorcycle drive assemblies. In particular, the present invention relates to transmission-to-engine mountings for motorcycle engines.

BACKGROUND OF THE INVENTION

Motorcycles are widely used for transportation and recreation. Motorcycles are typically powered by a drive assembly including an engine for generating power and a transmission for adjusting torque and speed. In one well-known motorcycle, the drive assembly comprises a left side drive layout wherein the engine includes a crankshaft or output shaft substantially parallel to an input shaft of the transmission. Power from the engine is transmitted to the transmission with a primary belt or chain interconnecting the parallel output and input shafts of the engine and transmission, respectively. The well-known drive assembly additionally includes a primary drive housing for enclosing the primary belt or chain interconnecting the parallel output and input shafts.

Over time, this left side drive layout has become one of several characteristic features that motorcycle enthusiasts identify as representative of quality and craftsmanship. Maintaining these characteristic features in new motorcycle designs is desirable to preserve the heritage of this popular motorcycle design. However, in many cases, these characteristic features demanded by motorcycle enthusiasts present obstacles to further development of the motorcycle. Thus, the challenge posed by these obstacles has been to improve the performance of the motorcycle while maintaining the traditional visual aspects of the motorcycle.

In this well-known motorcycle drive assembly, the engine and the transmission are typically mounted together by means of generally flat horizontal cantilevered pads that overlap one another at a rear of the engine crankcase and at a front of the transmission case. The two horizontal pads are typically held together by two vertical screws. To maintain proper alignment between the engine and the transmission, the primary housing extends across and bolts to the left sides of both the engine crankcase and the transmission case.

The lubrication system of the drive assembly typically comprises an oil pan, an oil return hose and an oil intake hose. The oil pan acts as a reservoir and contains oil while the oil is de-aerated and cooled. To provide the drive assembly with a compact configuration, the oil pan can be mounted remote or separately from the engine adjacent and below the transmission case. Unfortunately, due to the oil pan's positioning adjacent to the transmission case, the lubrication system requires lengthy hoses extending from the oil reservoir to the engine for providing oil to, and receiving oil from, the engine. These lengthy hoses require critical space, are prone to failure, and can be aesthetically unattractive.

SUMMARY OF THE INVENTION

The transmission of power from the output shaft of the engine to the input shaft of the transmission across the belt or chain generates large loads and a large amount of torque. Because the crankcase of the engine and the transmission case of the transmission are held together by two vertical screws, which react to shear loads at the interface of the crankcase and the transmission case, the interface acts like a hinge. As a result, the primary housing extending across and interconnecting the engine crankcase and the transmission case experiences high loads. The high loads can create misalignment between the engine and the transmission.

There is a continuing need for a compact, stiffer drive assembly that reduces the loads placed upon the primary drive housing and which more effectively circulates oil between the oil reservoir and the engine.

The present invention provides an improved motorcycle drive assembly that satisfies one or more of these needs. In one aspect of the invention, the drive assembly includes an engine having an output shaft, and a transmission having an input shaft substantially parallel to the output shaft and coupled to the output shaft (e.g., by a chain or belt). The engine additionally includes a crankcase having a first interface portion with a first non-horizontal (e.g., substantially vertical) mounting surface. The transmission additionally includes a transmission case having a second interface portion with a second non-horizontal (e.g., substantially vertical) mounting surface butting against or interconnected with the first non-horizontal mounting surface to achieve improved alignment and stability. Preferably, the mounting surfaces are substantially I-shaped to further enhance the engine-transmission interface.

In another aspect of the present invention, the crankcase and the transmission case define a cavity therebetween for housing at least one oil conduit that provides oil flow between the engine and the oil reservoir. Preferably, there are two conduits: one providing oil flow to the engine and one providing oil flow away from the engine.

In another aspect of the present invention, the drive assembly includes an oil reservoir adjacent to the transmission case. The second interface portion of the transmission case at least partially defines at least one oil passage in fluid communication with the oil reservoir.

BRIEF DESCRIPTION OF THE DRAWINGS

FIG. 4 is a fragmentary sectional view of the drive assembly taken along lines 4—4 of FIG. 3.

FIG. 5 is a fragmentary sectional view of the drive assembly taken along lines 5—5 of FIG. 3.

FIG. 6 is a fragmentary sectional view of the drive assembly taken along lines 6—6 of FIG. 3.

FIG. 7 is a fragmentary sectional view of the drive assembly taken along lines 7—7 of FIG. 3.

DETAILED DESCRIPTION OF THE PREFERRED EMBODIMENTS

Figure 1:
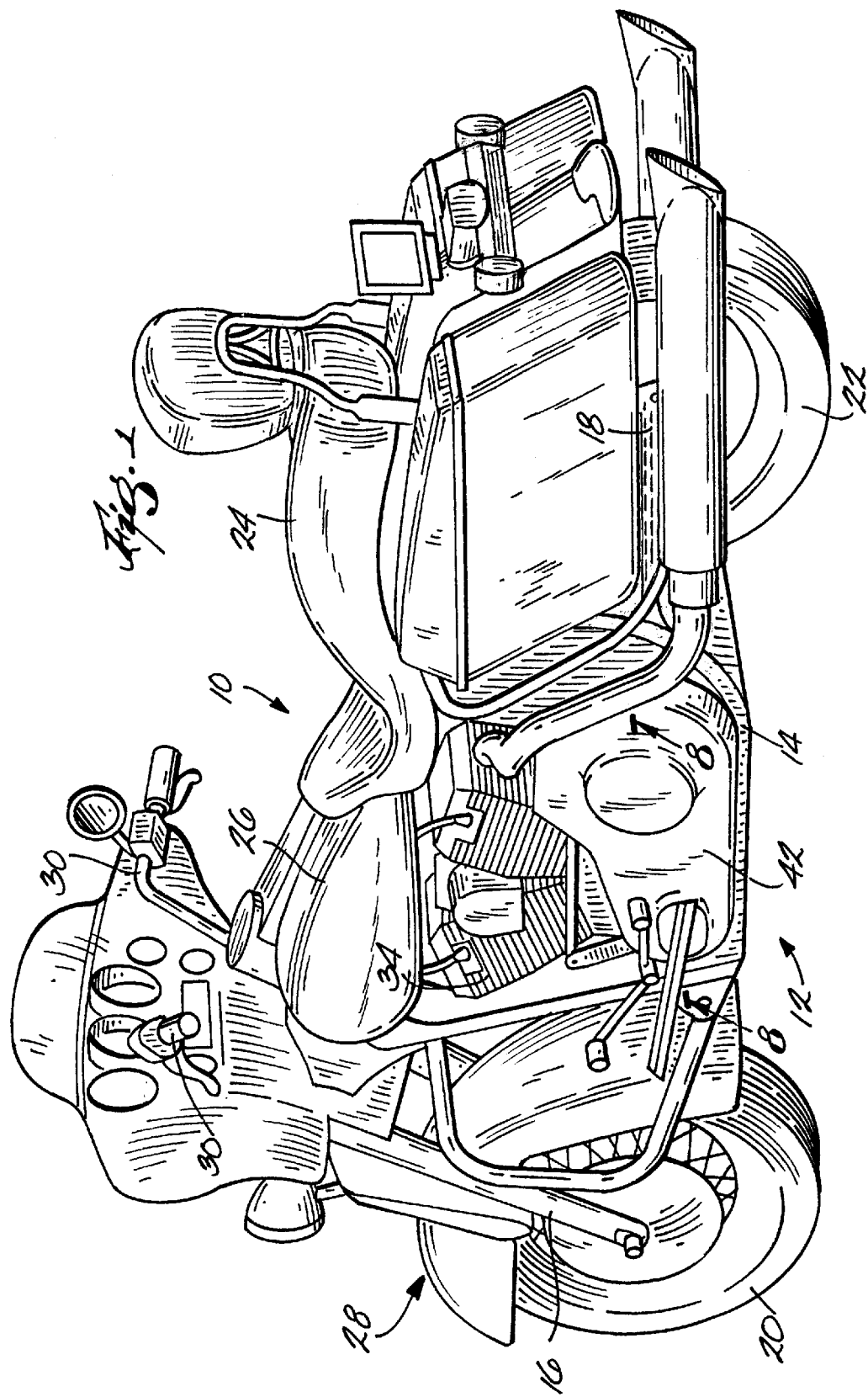
FIG. 1 is a perspective view of a motorcycle including a drive assembly embodying the present invention.

The illustrated motorcycle 10 includes a drive assembly 12, a frame 14, a front fork assembly 16, a rear fork assembly or swing arm 18, a front wheel 20, a rear wheel 22, a seat 24 and a fuel tank 26. As conventionally known, the frame 14 supports the drive assembly 12, the front fork assembly 16, the rear fork assembly 18, the seat 24, and the fuel tank 26. The front fork assembly 16 is pivotally supported at a front end 28 of the motorcycle 10 and supports the front wheel 20. The front fork assembly 16 includes a pair of handle bars 30 for steering the motorcycle 10. The rear fork assembly 18 is coupled to the frame 14 at a rear end of the motorcycle 10 and rotatably supports the rear wheel 22. The seat 24 is coupled to the frame 14 and is configured for supporting a rider. The fuel tank 26 is supported by the frame 14 and provides fuel to the drive assembly 12.

Figure 2:
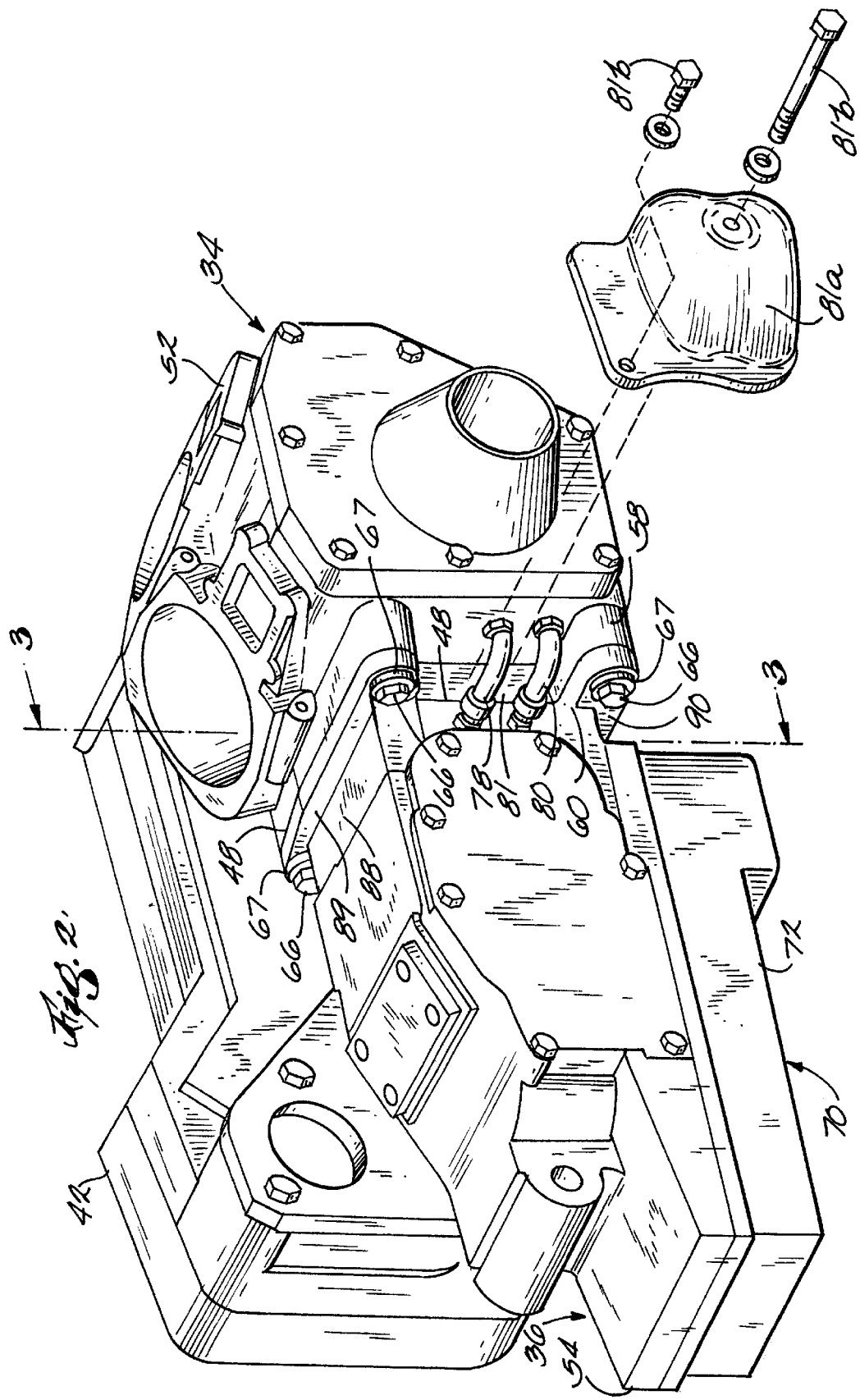
FIG. 2 is a perspective view illustrating a crankcase, a transmission case, a primary housing and a lubrication system of the drive assembly.
Figure 8:
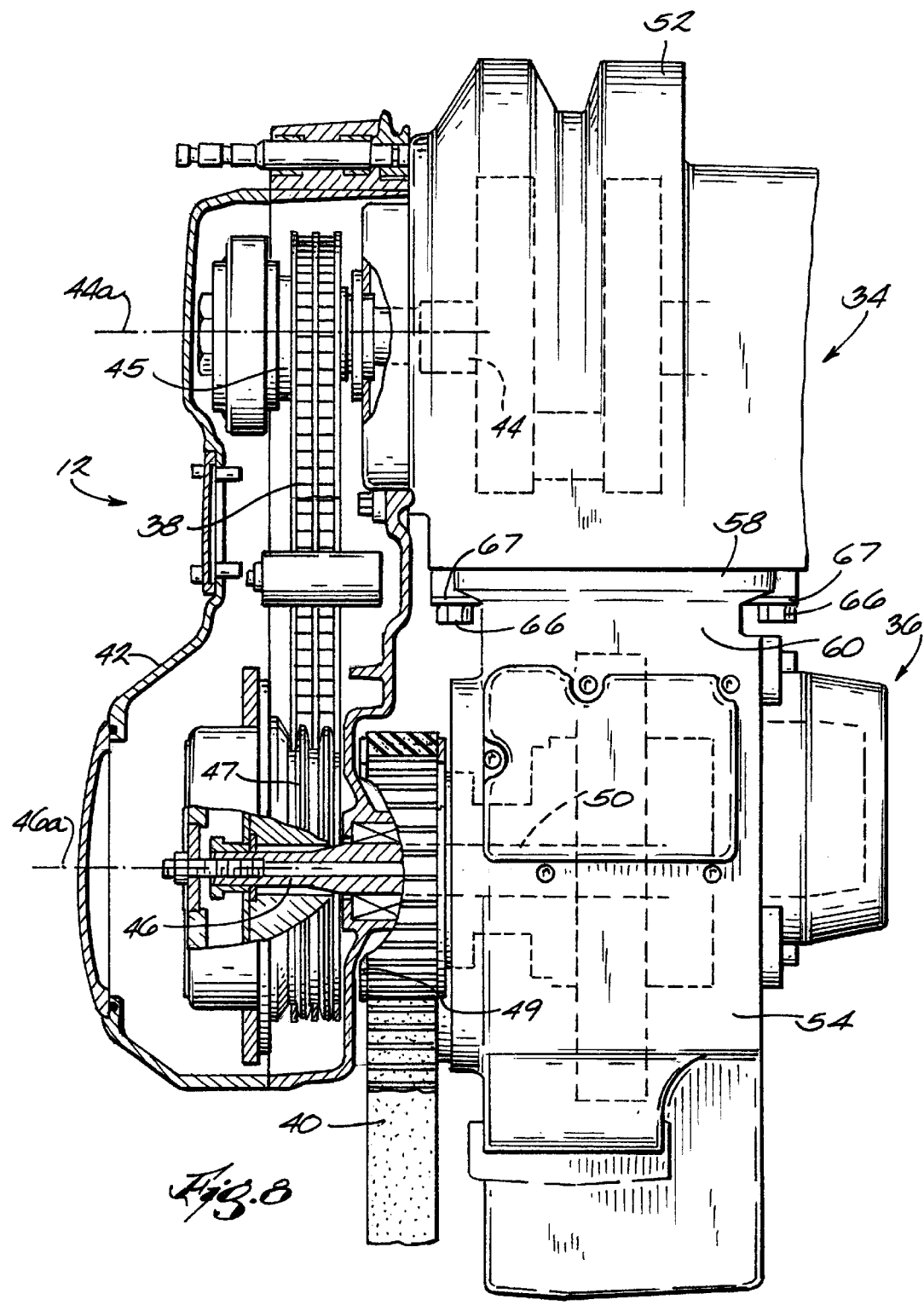
FIG. 8 is a partial section top view of the drive assembly.

The drive assembly 12 is preferably coupled to the frame 14 beneath the seat 24 between the front wheel 20 and the rear wheel 22 of the motorcycle 10. Referring to FIGS. 1 and 8, the drive assembly 12 generally includes an engine 34, a transmission 36, a primary chain 38, a secondary drive belt 40 and a primary drive housing 42. As shown in FIG. 2, the engine 34 and the transmission 36 comprise distinct, independent components of the drive assembly 12 that are supported adjacent one another along an interface 48. The engine 34 preferably comprises a V-twin engine supported by the frame 14 forward of the transmission 36. The engine 34 includes a conventionally known output shaft 44 (FIG. 8), such as a crankshaft, which includes a primary drive sprocket 45 for driving the primary chain 38 in a conventional manner to power the transmission 36.

Referring to FIGS. 1, 2, and 8, the transmission 36 includes an input shaft 46. The input shaft 46 is longitudinally spaced from the output shaft 44 and the centerline 46a of the input shaft extends generally parallel to the centerline 44a of the output shaft 44. The input shaft 46 includes a primary driven sprocket 47 supported in engagement with the primary chain 38. The primary chain 38 interconnects the output shaft 44 of the engine 34 to the input shaft 46 of the transmission 36 to transmit power from the engine 34 to the transmission 36. A secondary drive sprocket 49 is mounted for rotation about a secondary drive shaft 50 having a centerline that is substantially collinear with the centerline 46a of the input shaft 46.

The transmission 36 drives the secondary drive sprocket 49 through a series of transmission gears (not shown). The secondary drive sprocket 49 is driven by the secondary drive shaft 50 and in turn drives the secondary drive belt 40 to drive the rear wheel 22 of the motorcycle 10. Although the motorcycle 10 is illustrated as including the primary chain 38 and the secondary drive belt 40 for transmitting power from the engine 34 to the transmission 36 and for transmitting power from the transmission 36 to the rear wheel 22, respectively, various other power transfer arrangements may alternatively be used. For example, the sprockets used in conjunction with the primary chain 38 may be replaced with pulleys and belts. Similarly, the secondary drive belt 40 may be replaced with a sprocket-chain arrangement.

As shown in FIGS. 1 and 8, the output shaft 44 and the input shaft 46 both preferably extend from a left side of the drive assembly 12. Consequently, the drive assembly 12 of the motorcycle 10 complies with and maintains the traditional style and heritage of a motorcycle having a left side drive train. As is also traditional, the left side drive train, including the output shaft 44, the input shaft 46, and the primary chain 38, is enclosed by the primary drive housing 42 on the left side of the motorcycle 10.

The primary drive housing 42 is a generally hollow enclosure extending between and fixedly coupled to the engine 34 and the transmission 36 on a left side of the motorcycle 10. The primary drive housing 42 encloses and shields the output shaft 44, input shaft 46 and primary chain 38. In addition, the primary drive housing 42 assists in rigidly supporting the engine 34 relative to the transmission 36.

FIG. 2 is a perspective view illustrating a right side of the drive assembly 12 in greater detail. For ease of illustration, several components of the drive assembly 12 are omitted. As shown in FIG. 2, the engine 34 and the transmission 36 are housed and enclosed by a crankcase 52 and a transmission case 54, respectively. The crankcase 52 is a generally rigid enclosure surrounding a lower end of the engine 34 and includes an interface portion 58. Similarly, the transmission case 54 is a generally rigid enclosure enclosing the transmission 36 and includes an interface portion 60.

The interface portion 58 preferably projects away from the crankcase 52 towards the transmission case 54, and defines a substantially non-horizontal mounting surface for butting against or interconnecting with the interface portion 60 of the transmission case 54. Likewise, the interface portion 60 preferably projects away from the transmission case 54, and defines a non-horizontal mounting surface 64 (shown in FIG. 3) for butting against or interconnecting with the non-horizontal mounting surface of the interface portion 58. The interface portions 58, 60 may directly abut each other, or may be interconnected with a gasket or other suitable sealing member between them.

The interface portions 58 and 60 are rigidly secured adjacent one another by non-vertical (e.g., substantially horizontal) connectors 66 and washers 67 (FIGS. 2 and 8). In the illustrated embodiment, the connectors 66 comprise elongated bolts extending through the interface portion 60 and threaded into the interface portion 58. Alternatively, the interface portions 58 and 60 may be supported adjacent to one another by a variety of other well known connectors. Because interface portions 58 and 60 are interconnected along substantially non-horizontal mounting surfaces and because the interface portions 58 and 60 are coupled to one another by non-vertical connectors 66, the interface 48 of the crankcase 52 and the transmission case 54 is stiffer and less susceptible to misalignment caused by shear loads. As a result, the primary drive housing 42 connected between the crankcase 52 and the transmission case 54 experiences smaller loads. In addition, because the interface portions 58 and 60 are interconnected along substantially non-horizontal surfaces, the interface portions 58 and 60 enable the crankcase 52 and the transmission case 54 to be more easily and accurately aligned relative to one another.

As shown in FIG. 2, the drive assembly 12 additionally includes an oil reservoir system 70 for housing lubricating fluid for lubricating the engine 34. The oil reservoir system 70 generally includes an oil pan 72, oil passages 74 and 76 (shown in FIGS. 3–7) and oil conduits 78 and 80. The oil pan 72 is supported below the transmission case 54 and is configured for containing oil while the oil is de-aerated and cooled. Once the oil is de-aerated and cooled, a pump (not shown) pumps the oil through the oil passage 76 and through the oil conduit 80 to the engine 34 for lubricating the engine 34. Oil is returned from the engine 34 to the oil reservoir system 70 for cooling and de-aeration through the oil conduit 78 and through the oil passage 74 (shown in FIG. 3).

As shown in FIGS. 2–4 and 6, the interface portions 58 and 60, along with the crankcase 52 and transmission 54, define a cavity 81. The cavity 81 receives and partially surrounds the oil conduits 78 and 80 to protect the oil conduits 78 and 80 as well as to recess the conduits 78 and 80 at least partially within the drive assembly 12. As a result, the oil conduits 78 and 80 may be completely covered and hidden from view with a simple cover 81a (FIGS. 2 and 4) extending over the conduits 78 and 80, thereby creating a more pleasing aesthetic appearance. The cover 81a is fastened to the engine 34 and transmission 54 with fasteners 81b.

Figure 3:
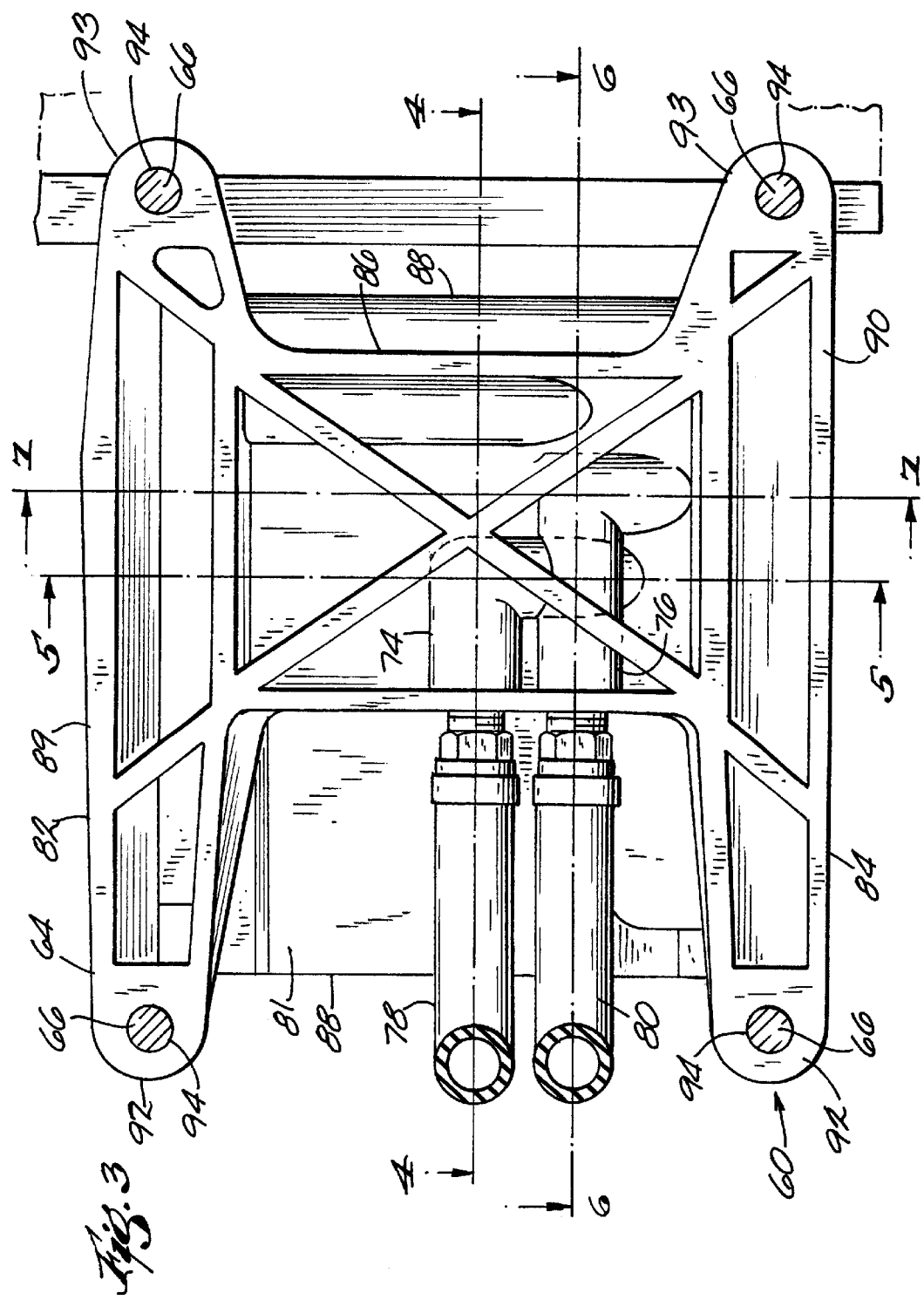
FIG. 3 is a sectional view of the drive assembly taken along lines 3—3 of FIG. 2 at the interface between the crankcase and the transmission case and with the oil conduit cover removed.

As best shown in FIG. 3, the interface portion 60 preferably includes a pair of legs 82 and 84 and a cross member 86. The legs 82 and 84 are vertically spaced from one another at the upper and lower ends of the transmission case 54. Referring to FIG. 2, the legs 82 and 84 extend both vertically and laterally beyond a main body 88 of the transmission case 54. In particular, the leg 82 includes an upper edge portion 89 extending upwardly beyond the main body 88. The lower leg 84 includes a lower edge portion 90 ending below the main body 88. The legs 82 and 84 each additionally include opposite ends 92, 93 which laterally project beyond the main body 88. The ends 92 and 93 are mounted to the interface portion 58 of the crankcase 52 (shown in FIG. 2) by the connectors 66 and washers 67 (FIG. 2). In the illustrated embodiment, each leg 82 and 84 defines a bore 94 at opposite ends for receiving the connectors 66. Because the legs 82 and 84 project vertically and laterally beyond the main body 88 of the transmission case 54, the legs 82 and 84 provide a larger non-horizontal mounting surface to interconnect with the interface portion 58 of the crankcase 52. As a result, the legs 82 and 84 increase the overall stiffness of the interface between the crankcase 52 and the transmission case 54. Because the ends 92 and 93 of the legs 82 and 84 support the connector 66 laterally beyond the main body 88 of the transmission case 54, the connectors 66 are more easily accessed for easier assembly and disassembly. The cross member 86 extends between the legs 82 and 84 intermediate the opposite ends thereof. The cross member 86 at least partially defines the passages 74 and 76 for the transmission of oil.

In the illustrated embodiment, the cross member 86 and the legs 82 and 84 are configured to provide the interface portion 60 with a general I-shaped cross-section. The preferred I-shaped configuration formed at the junction of the interface portions 58 and 60 increases the stiffness and load bearing capability of the drive assembly 12 and provides a reliable, compact circulation pathway for oil between the oil reservoir system 70 (shown in FIG. 2) and the engine 34. Although not shown in detail, the interface portion 58 of the crankcase 52 is substantially identical in shape to the interface portion 60 except that the cross member of the interface portion 58 does not define the oil passages 74 and 76.

FIGS. 4–7 illustrate the oil passages 74, 76 and the oil conduits 78, 80 in greater detail. As shown in FIGS. 4 and 5, the oil passage 74 is a generally hollow passageway extending from the cavity 81 to an interior of the oil reservoir system 70 through the cross member 86. As shown in FIG. 4, the oil passage 74 preferably perpendicularly extends into the cross member 86. As best shown in FIG. 5, the oil passage 74 further extends downwardly so as to fluidly communicate with the interior of the reservoir defined by the oil pan 72.

The oil passage 74 is preferably cast into the transmission case 54. Alternatively, the oil passage 74 may be formed by drilling or boring. The oil passage 74 may additionally be provided with a lining such as an inner coating applied to inner walls thereof or a tube may be inserted through the oil passage 74. Although the oil passage 74 is illustrated as extending through an L-shaped path through the cross member 86, the oil passage 74 may have a variety of other shapes and may extend through a variety of alternative portions of the transmission case 54 so as to provide fluid communication between the engine 34 and the oil reservoir system 70.

The oil conduit 78 fluidly connects the oil passage 74 and the interior of the engine 34. The oil conduit 78 preferably includes fluid couplings 96, 97, a hose 98 and clamps 99, 100. The fluid coupling 96 is conventionally known and generally includes a first end which is threaded into the oil passage 74 and a second end which is fitted within the hose 98. The clamp 99 extends about the hose 98 and further seals the hose 98 to the fluid coupling 96.

The fluid coupling 97 is identical to the fluid coupling 96 except that the fluid coupling 97 is threaded into the bore 101 extending through the crankcase 52 to communicate with the engine 34. The fluid coupling 97 further includes a second end fitted within the hose 98. The clamp 100 extends about the hose 98 and about the second end of the fluid coupling 97 to sealingly secure the hose 98 about the fluid coupling 97. As indicated by the arrows A, oil from the engine 34 flows through the bore 101 through the fluid coupling 97, the hose 98 and the fluid coupling 96 into the oil passage 74. The oil flows through the oil passage 74 formed within the transmission case 54 into the oil pan 72 for de-aeration and cooling.

Although the fluid conduit 78 is illustrated as a hose with couplings at each end, the fluid conduit 78 may alternatively comprise any one of a variety of fluid conduits such as metal or elastomeric tubes. Furthermore, in lieu of merely extending through and within the cavity 81, the fluid conduit 78 may additionally extend through and within the fluid passage 74 to the oil reservoir system 70.

Once the oil has been cooled and de-aerated within the oil pan 72, the oil must be returned to the engine 34 to further lubricate the engine 34. The oil passage 76 and the oil conduit 80 direct the oil from the oil reservoir system 70 back to the engine 34. As best shown in FIG. 7, the oil passage 76 is a generally hollow passageway extending diagonally upward from the interior of the oil reservoir system 70. As shown in FIG. 6, the oil passage 76 then laterally turns towards the cavity 81 for connection with the oil conduit 80.

The oil passage 76 is preferably cast as part of the transmission case 54. Alternatively, the oil passage 76 may be formed by boring or drilling into the transmission case 54. The oil passage 76 may additionally be provided with a lining such as an inner coating applied to inner walls of the oil passage 76 or a fluid tube inserted through the oil passage 76. Although the oil passage 76 is illustrated as extending through a generally L-shaped path through the cross member 86 of the interface portion 60, the oil passage 76 may have a variety of other shapes and may extend through various other portions of the transmission case 54 so as to provide fluid communication between the oil reservoir system 70 and the engine 34.

The oil passage 76 fluidly connects the oil conduit 80 and the interior of the engine 34. In the illustrated embodiment, the oil conduit 80 includes fluid couplings 102 and 104, a hose 106 and clamps 108, 109. The fluid coupling 102 is conventionally known and generally includes a first end which is threaded into the oil passage 76 and a second end which is fitted within the hose 106. The oil conduit 98 and the oil conduit 106 are identical and interchangeable parts. The clamp 108 extends about the hose 106 and further seals the hose 106 to the fluid coupling 102.

The fluid coupling 104 is identical to the fluid coupling 102 except that the fluid coupling 104 is threaded into the bore 110 extending through the crankcase 52 to communicate with the engine 34. The fluid coupling 104 is further fitted within the hose 106. The clamp 109 extends about the hose 106 and about an end of the fluid coupling 104 to sealingly secure the hose 106 about the fluid coupling 104. As indicated by arrows B, oil flows from the oil reservoir system 70 through the oil passage 76, the oil conduit 80 and the bore 110 to the engine 34 for the lubricating engine 34.

Although the fluid conduit 80 is illustrated as a hose with couplings at each end, the fluid conduit 80 may alternatively comprise any one of a variety of fluid conduits such as metal or elastomeric tubes. Furthermore, in lieu of merely extending through and within the cavity 81, the fluid conduit 80 may additionally extend through and within the fluid passage 76 to the oil reservoir system 70.

In conclusion, the interface portions 58 and 60 of the crankcase 52 and the transmission case 54, respectively, provide a stiff and easily-aligned junction between the crankcase 52 and the transmission case 54. Because the interface portions 58 and 60 are interconnected along non-horizontal mounting surfaces and because the interface portions 58 and 60 are coupled to one another by non-vertical connectors 66, the interface of the crankcase 52 and the transmission case 54 is stiffer and less susceptible to misalignment caused by shear loads. Consequently, the primary drive housing 42 connected between the crankcase 52 and the transmission case 54 experiences smaller loads.

In addition, the interface portions 58 and 60 also provide more reliable, effective, inconspicuous and aesthetically pleasing oil circulation between the oil reservoir system 70 and the engine 34. Because the cavity 81 of the interface portions 58 and 60 recesses the oil conduits 78 and 80, the oil conduits 78 and 80 are inconspicuously housed and protected. Because the oil passages 74 and 76 lie within the transmission case 54, lengthy hoses which require critical space, which are prone to failure and which are aesthetically unattractive, are eliminated.

As a result, the interface portions 58 and 60 improve upon both the performance and the aesthetic appearance of the motorcycle, while permitting the traditional overall appearance of the motorcycle to be sustained.

Although particular embodiments of the present invention have been shown and described, other alternative embodiments will be apparent to those skilled in the art and are within the intended scope of the present invention. Thus, the present invention is to be limited only by the following claims.

What is claimed is:

1. A motorcycle comprising:
    a front wheel;
    a rear wheel;
    a frame supported by said front wheel and said rear wheel;
    an engine supported by said frame and having a first interface portion;
    a transmission case separate from said engine, supported by said frame, and having a second interface portion; and
    at least one fastener causing said first and second interface portions to engage each other along a non-horizontal interface when said motorcycle is positioned upright with said front and rear wheels on a horizontal surface, wherein said first and second interface portions together define a side cavity, said side cavity at least partially housing an oil conduit.

2. The motorcycle of claim 1, further comprising:
    an engine output shaft supported for rotation within said engine; and
    a transmission input shaft mounted for rotation within said transmission case, said input shaft being substantially parallel to and coupled to said output shaft.

3. The motorcycle of claim 1, wherein said first and second interface portions have I-shaped cross-sections.

4. The motorcycle of claim 1, wherein said first interface portion is engaged with said second interface portion along a substantially vertical interface when said motorcycle is positioned upright with said front and rear wheels on a horizontal surface.

5. A motorcycle comprising:
    a front wheel;
    a rear wheel;
    a frame supported by said front wheel and said rear wheel;
    an engine supported by said frame and including a rearwardly-facing portion and a first interface portion having an outer surface;
    a transmission supported by said frame and including a forwardly-facing portion and a second interface portion having an outer surface, said second interface portion being engaged with said first interface portion, wherein said outer surface of said first interface portion, said outer surface of said second interface portion, said forwardly-facing portion of said transmission, and said rearwardly-facing portion of said engine together define a side cavity; and
    an oil conduit positioned within said side cavity.

6. The motorcycle of claim 5, further comprising an oil reservoir in fluid communication with said engine through said oil conduit.

7. The motorcycle of claim 6, wherein said oil reservoir is at least partially defined by an oil pan mounted below said transmission.

8. The motorcycle of claim 6, wherein said oil conduit includes a first conduit and a second conduit, said first conduit allowing oil to flow from said engine to said oil reservoir, said second conduit allowing oil to flow from said oil reservoir to said engine.

9. The motorcycle of claim 5, wherein said oil conduit bends substantially 90°.

10. The motorcycle of claim 5, further comprising an oil passage within said transmission that is in communication with said oil conduit.

* * * * *